United States Patent [19]
Zach, Jr.

[11] 3,918,560
[45] Nov. 11, 1975

[54] GEAR SHIFT SPLINE LOCK

[75] Inventor: George O. Zach, Jr., Hales Corners, Wis.

[73] Assignee: Allis-Chalmers Corporation, Milwaukee, Wis.

[22] Filed: Nov. 13, 1974

[21] Appl. No.: 523,490

[52] U.S. Cl.................. 192/114 T; 74/530; 74/462
[51] Int. Cl.² ......................................... F16D 11/04
[58] Field of Search............ 192/20, 114 T; 74/530, 74/406, 466

[56] References Cited
UNITED STATES PATENTS

| 2,062,927 | 12/1936 | Peterson | 74/466 X |
| 2,070,140 | 2/1937 | Peterson et al. | 192/114 T |
| 2,529,492 | 11/1950 | Gilbert | 192/114 T |
| 3,219,164 | 11/1965 | Henyon | 192/114 T |

Primary Examiner—Benjamin W. Wyche
Attorney, Agent, or Firm—Arthur L. Nelson

[57] ABSTRACT

A spline lock for locking gears in engagement when the transmission is in operation. The shoulders of the internal and external spline teeth engage to lock the gears in engagement.

10 Claims, 5 Drawing Figures

GEAR SHIFT SPLINE LOCK

This invention relates to a clutching means in a power transmission and more particularly to a spline lock on positive type clutch members for locking gears in engagement when the transmission is in operation.

Transmissions in motor vehicles employing shifting mechanisms to provide various speed ratios in the transmission occasionally have a problem of becoming disengaged while power is transmitted through the transmission. Under circumstances where the engine is being used as a brake and the inertia of the verhicle tends to drive the vehicle faster disengagement of the transmission may be dangerous. Whatever the circumstances which tend to disengage the clutch or gears, the creeping out of mesh of the torque transmitting members is not only objectionable, but may create a dangerous situation particularly where the engine is being used to brake the vehicle while moving down a steep hill.

The cause of the torque transmitting members becoming disengaged is not entirely understood, however, it is believed that such disengagement is a result of gradual creeping of the slidable members due to the combined effect of the load forces, vibration, and deflection of the transmission structure and resilience of the materials themselves causing an axial component acting to disengage the torque transmitting members. Since it does not occur in all transmissions, it is felt that in part it is due to manufacturing irregularities and possibly distortion of the components due to heat treatment of the parts. Accordingly, it is desirable to prevent the members from becoming disengaged and failing to transmit the power through the transmission while the transmission is supposedly in operation. The manufacturing tolerances are usually held within reasonable limits and also the variations due to heat treating and surface finishing of the components are also held within reasonable tolerances. Usually the closer the tolerance the greater the cost of manufacturing. Accordingly, any disengagement tendencies in a transmission which may be inherent under normal manufacturing standards must be overcome to prevent the clutch or spline from becoming disengaged and to provide continuous transmission of power. Accordingly, this invention provides such a device.

It is an object of this invention to provide a clutching means in a power transmission with a spline lock to maintain the clutching means in engagement.

It is another object of this invention to provide a power transmission including a positive clutch with sliding torque transmitting members having a spline lock to lock a clutch collar with a splined gear when the clutch is engaged.

Also, it is another object of this invention to provide a spline lock such that when the power is not being transmitted through the transmission, disengagement of the clutch shall be no different than if spline lock was not present.

It is a further object of this invention to provide a spline lock in a positive clutch of a power transmission by using a tapered gear tooth to bias the spline which is coupling the gear to a clutch collar to lock the clutch collar in engagement with the spline portion of the gear to prevent the clutch from becoming disengaged when the transmission is in operation.

The objects of this invention are accomplished by relieving a portion of the spline by an annular groove on the collar so that the spline on the collar exists only under the transmitted gear force and radially inward from the gear teeth. The gear teeth are tapered so that the spline of the gear tends to tilt and in effect lock itself in place due to the tapered teeth of the sliding gear. The spline on the external periphery of the clutch collar is formed in two sets of spline teeth separated by annular recess intermediate the two sets of spline teeth. As the gear cocks the spline teeth on the internal periphery of the gear engage a shoulder on one set of the spline teeth of the collar and lock the clutch in its engaged position.

Conversely, when power is not being transmitted, the gear returns to a normal position and shifting out of engagement is such as if no lock was present.

The preferred embodiment of this invention is illustrated in the attached drawings.

Figure 1:
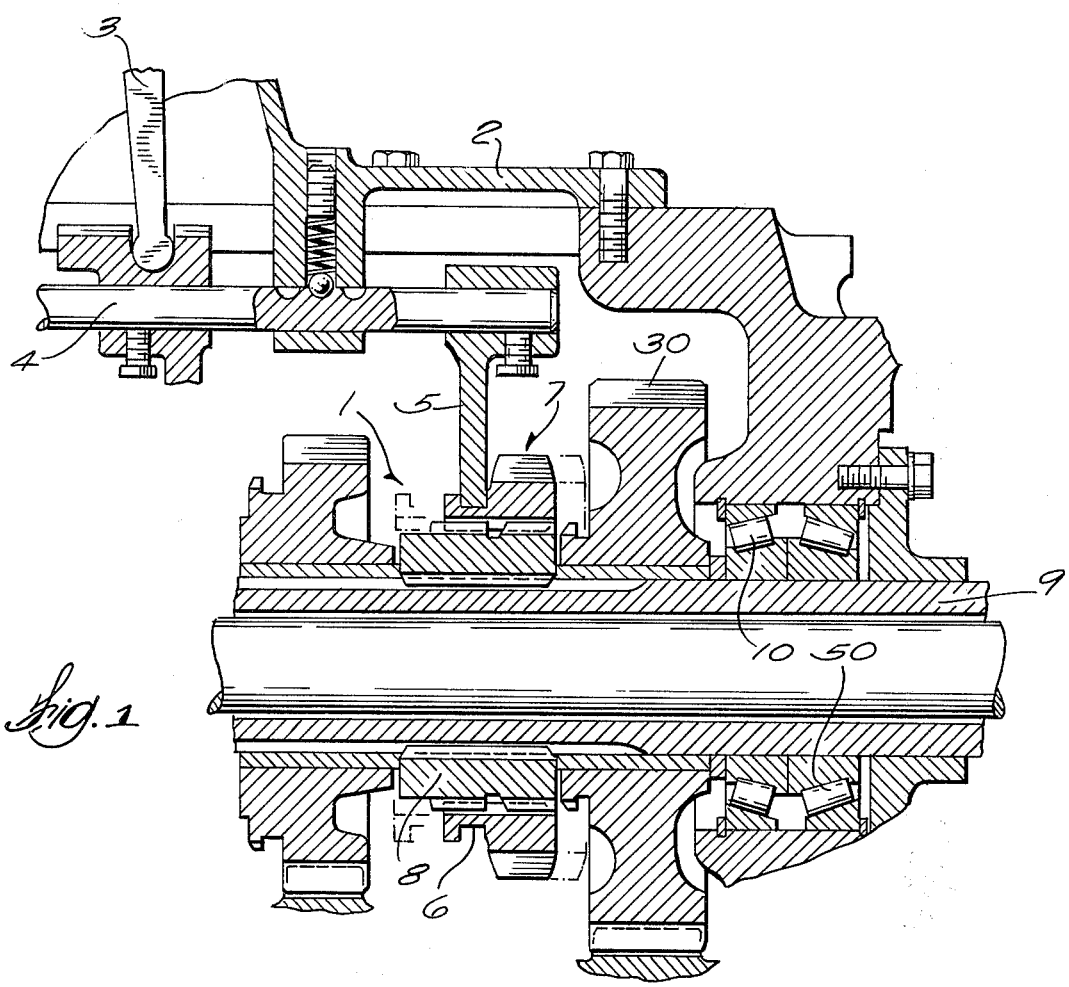
FIG. 1 illustrates a section of the power transmission.

Referring to the drawings, FIG. 1 illustrates a portion of a vehicle transmission showing a positive type clutch 1. The transmission housing 2 supports a shift lever 3 which pivotally connects to the shift rail 4 carrying the shift fork 5. The shift fork 5 is received in the recess 6 of the combination clutch sleeve and gear 7. The combination clutch sleeve and gear 7 is slidably connected through a spline connection between the clutch sleeve and gear 7 and the clutch collar 8. The clutch collar 8 is also spline connected to the quill shaft 9 which is rotatably mounted in the transmission housing by a plurality of bearings of which bearings 10 and 50 are shown.

Figure 2:
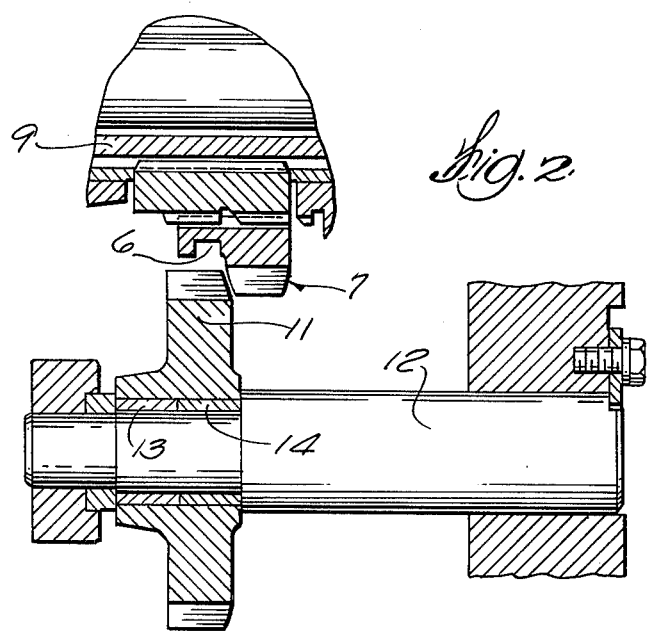
FIG. 2 illustrates a portion of the transmission showing the idler gear disengaged from the shifting gear of the transmission.

The combination clutch sleeve and gear 7 is also shown in FIG. 2 for selectively engaging the idler gear 11 which is rotatably mounted on the stubshaft 12 by means of the bearing assemblies 13 and 14. FIG. 2 shows the idler gear 11 disengaged from the combination clutch sleeve and gear 7.

Figure 3:
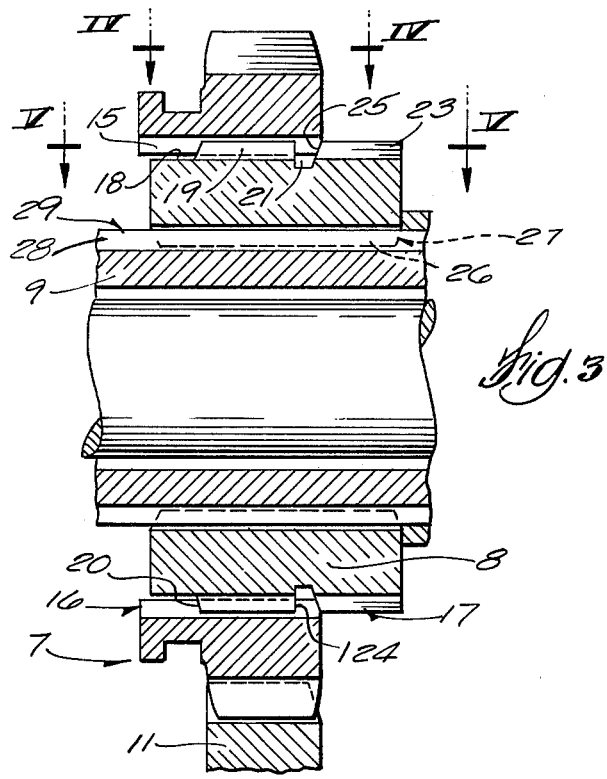
FIG. 3 illustrates the sliding gear and clutch collar and the relationships of their connecting spline when the sliding gear is in the engaged position.

FIG. 3 shows the idler gear 11 engaged with the combination clutch sleeve and gear 7. The spline tooth 15 of the spline 16 on the internal periphery of the combination clutch sleeve and gear 7 extends the axial length of the gear. The clutch collar 8 is formed with an external spline 17. The external spline 17 is recessed on the lefthand end by the annular recess 18 which shortens the first set of spline teeth 19 and forms a shoulder 20 on the lefthand end. Similarly, the annular groove 21 forms the first set of gear teeth 19 and second set of gear teeth 23.

The shoulder 124 of teeth 19 forms one side of the annular recess 21 while the shoulder 25 of teeth 23 forms the other side of the annular recess.

The spline teeth 26 of the spline 27 engage the mating spline teeth 28 of the spline 29 on the shaft 9.

FIG. 2 illustrates the idler gear 11 in the disengaged position from the combination clutch sleeve and gear 7. The combination clutch sleeve and gear 7 is shifted by the shifting fork 5 and can be shifted in the righthand position to operate the clutch to drive the gear 30 with the clutch collar 8 and connecting the gear 30 to the shaft 9.

Figure 4:
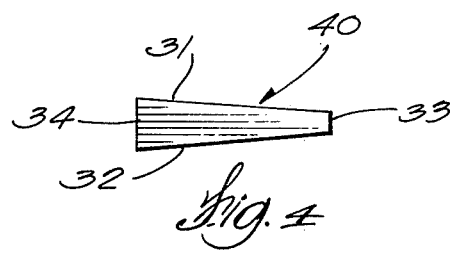
FIG. 4 is a cross section view illustrating the tapered gear tooth taken on line IV—IV of FIG. 3.

FIG. 4 illustrates a cross section view of one of the gear teeth of the combination clutch sleeve and gear 7. The tooth is formed with a tapered surface 31 of the upper side as shown in FIG. 3 and a tapered surface 32 of the lower side as shown in FIG. 3. The tooth is tapered in the righthand direction with a lesser tooth thickness 33 on the righthand portion of the tooth a greater tooth thickness 34 on the lefthand portion of the tooth.

Figure 5:
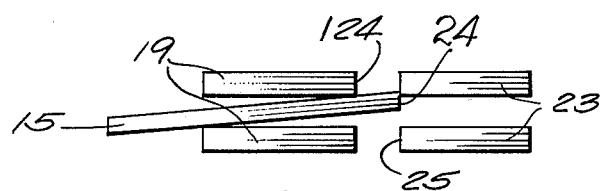
FIG. 5 is a cross section view of the splines taken on line V—V of FIG. 3.

The spline of the combination clutch sleeve and gear 7 is tilted as shown in FIG. 5. The spline tooth 15 is cocked between the teeth 19 and 23 of the clutch collar 8. The tilting action of the spline teeth 15 causes a shoulder 24 to engage the shoulder 25 of the second set 17 of spline teeth 23 when the idler gear 11 is locked with the combination clutch sleeve and gear 7.

The operation of this device will be described in the following paragraphs.

It is noted that the gear tooth 40 has a tapered surface 31 and 32 on either side of the tooth. Accordingly, if the combination clutch sleeve and gear 7 is the driving element or the driven element in the gear train, the tendency to cock the gear spline 15 is inherently present in either form of drive. For the purpose of illustration, however, it will be assumed that the idler gear 11 is the driving member which drives the combination clutch sleeve and gear 7. Assuming that the gear tooth 40 is forced in a downwardly direction as shown in FIG. 4, the spline tooth 15 of the combination clutch sleeve and gear 7 will be tilted as shown in FIG. 5. It is noted that the gear teeth 40 are immediately over the teeth 19 of the clutch collar 8. Since the first set of spline teeth 19 of the clutch collar 8 are shorter than the spline teeth 15 of the combination clutch sleeve and gear 7 and there is clearance between the spline teeth of these two members, the tilting action is permitted. The tilting action, of course, is exaggerated as shown in FIG. 5. It is, however, possible to provide a tilting action sufficiently for the shoulder 24 of the tooth 15 on the combination clutch sleeve and gear 7 to engage the shoulder 25 of the second set of spline teeth 23 of the spline 17. With interference between the shoulders 24 and 25, the gear 7 cannot slide in a righthand direction and accordingly, is maintained in its engaged position with the idler gear 11. When power is released through a transmission clutch, the gears are permitted to align themselves with the teeth of the mating splines axially parallel. In this position, the combination clutch sleeve and gear 7 is permitted to slide in the righthand direction and disengage with the idler gear 11. The transmission can be manually disengaged by movement of the shift lever 3 moving the shift fork 5 in the righthand direction to place the combination clutch sleeve and gear 7 in the position shown in FIG. 2 in which there is no engagement between the idler gear 11 and the combination clutch and gear 7.

The embodiments of the invention in which an exclusive property or privilege is claimed are defined as follows:

1. A spline lock for a gear shifting mechanism in a power transmission comprising, a rotating torque transmitting gear, gear teeth on the external periphery of said gear defining an axially tapered tooth surface on the side of each of said gear teeth, an internal spline defining internal spline teeth on the internal periphery of said gear, a torque transmitting member rotating on a common axis with said gear, an external spline defining external spline teeth on the external periphery of said torque transmitting member, said external spline including a first set of external spline teeth and a second set of external spline teeth axially aligned and separated by an annular groove, another gear, said tapered surface of the gear teeth on the external periphery of said torque transmitting gear engaging said other gear thereby tending to tilt the internal spline of said torque transmitting gear for engagement of an end of said second set of external spline teeth to thereby lock said splines for retaining engagement between said gears.

2. A spline lock for a gear shifting mechanism in a power transmission as set forth in claim 1 including means positioning said first set of spline teeth radially under the gear teeth of said torque transmitting gear when said gears are engaged.

3. A spline lock for a gear shifting mechanism in a power transmission as set forth in claim 1 wherein said gear teeth on the external periphery of said torque transmitting gear define tapered surfaces on both sides of said gear.

4. A spline lock for a gear shifting mechanism in a power transmission as set forth in claim 1 wherein said second set of spline teeth on said torque transmitting member define shoulders for axially engaging with the internal spline of said gear when said gear and torque transmitting members are engaged.

5. A spline lock for a gear shifting mechanism in a power transmission as set forth in claim 1 wherein the ends of said second set of spline teeth define first shoulders, the adjacent ends of teeth of said internal spline of said gear define second shoulders for engaging the first shoulders of said second set of spline teeth of said torque transmitting member when said gears are engaged.

6. A spline lock for a gear shifting mechanism in a power transmission as set forth in claim 1 wherein said torque transmitting gear defines a drive gear for driving said torque transmitting member when said clutch is engaged.

7. A spline lock for a gear shifting mechanism in a power transmission as set forth in claim 1 wherein said internal spline of said gear defines spline teeth of a predetermined thickness, said spline on said torque transmitting member defines spaces between the spline teeth of greater thickness than the tooth thickness of said internal spline of said gear to allow a tilting movement.

8. A spline lock for a gear shifting mechanism in a power transmission as set forth in claim 1 including means tapering said gear teeth of said torque transmitting gear toward said second set of spline teeth on said torque transmitting member.

9. A spline lock for a gear shifting mechanism in a power transmission as set forth in claim 1 wherein the spline teeth on the inner periphery of said gear define teeth of a substantially greater length than the spline teeth on the external periphery of said torque transmitting member of either said first set of spline teeth and said second set of said spline teeth whereby the overall length of the combination of said two sets of spline teeth on the external periphery of said torque transmitting member extend substantially the same length as the length of the spline teeth on the internal periphery of said gear.

10. A spline lock for a gear shifting mechanism in a power transmission as set forth in claim 1 wherein said external spline of said torque transmitting member defines a recess between the end of said first set of spline teeth and the same end of said torque transmitting member.

* * * * *